INVENTORS
RICHARD PROSKAUER
VICTOR J. YOUNG
BY
ATTORNEY

March 11, 1947. R. PROSKAUER ET AL 2,417,086
HOMING SYSTEM
Filed Dec. 31, 1943  2 Sheets-Sheet 2

INVENTORS
RICHARD PROSKAUER
VICTOR J. YOUNG
BY
ATTORNEY.

Patented Mar. 11, 1947

2,417,086

UNITED STATES PATENT OFFICE 2,417,086

HOMING SYSTEM

Richard Proskauer, Westbury, and Victor J. Young, Jamaica, N. Y., assignors to Sperry Gyroscope Company, Inc., a corporation of New York Application December 31, 1943, Serial No. 516,384

11 Claims. (Cl. 250—11)

This invention relates to direction-finding and, more especially, to omnidirectional beacons, or systems which employ a rotating beam of electromagnetic energy, with characteristic modulation of the energy for the various angular positions or directions of the beam.

The principal object of the present invention is to provide improved methods of and apparatus for sweeping such a beam of electromagnetic energy while modulating the energy in a manner that will allow one who receives the energy to readily perceive his orientation relative to the transmitter with a minimum amount of equipment, and without the need for special skills.

Another object is to provide an omnidirectional beacon for use on dirigible craft, with means for stabilizing the rotation of the beam relative to a reference line or direction, and independent of changes in the attitude of the craft.

A further object is to provide an improved code system of modulation wherein the beam may indicate a large number of separate positions with a relatively small number of code characters.

A further object is to provide a system for dividing the circular path, representing the successive positions of the beam, with a finite number of modulation characters, while providing an indication of an infinite number of positions for receiving stations located along the path.

A still further object is to provide a system whereby the operator of the receiving equipment may estimate his distance from the transmitter.

These and other objects will become more apparent from the following description in conjunction with the appended drawings disclosing representative embodiments of the invention.

Generally speaking, the invention comprehends rotating a beam of electromagnetic energy and characteristically modulating the energy as by keying the energy according to standard alphabetic code symbols for the respective positions of the beam. Since the transmitter of the energy may be located on a movable support, gyroscopic or similar means are provided to stabilize the beam motion and the modulation characteristics thereof in one or more planes.

The present system is of special utility to airplane pilots, who, while out on missions, are anxious to determine the position of their craft relative to an aircraft carrier or other base toward which the aircraft are flying. These aircraft commonly comprise scouting planes operated by fighter pilots who have a limited background in radio, and hence who require a system whose operation involves as little specialized radio skill as possible. Additionally, the aircraft which these pilots operate are designed for high speed and maneuverability so that any homing radio system must necessarily involve the least possible weight of receiving equipment on the aircraft. The system must be extremely simple in its operation to be satisfactory because it finds a high degree of utility immediately following an encounter between the pilot and an opposing force, in which case the pilot, as a result of injury, shock, or loss of bearings, may be in a dazed or confused condition and hence unable to perform any complicated mental operations. In addition, an omnidirectional beacon system employed for this purpose must maintain as high a degree of secrecy in operation as to unauthorized persons as is consistent with the satisfactory performance of its necessary functions.

Conventional radio direction finding receivers are unsuitable for the purpose because of the unnecessarily large amount of equipment and high degree of operating skill required. Likewise, because of the great premium on weight and space in such fighter planes and particularly because of the undesirability of further complicating or crowding the present instrument panel, it is highly desirable to present the information to the pilot through some mechanism already in the plane and to add only a very small amount of additional equipment. It has been determined, therefore, that a simple rotating beacon at the transmitter utilizing continuous wave or code modulation according to an improved system permits the use of the simplest type of receiving equipment, and requires a minimum number of parts in addition to equipment already in the plane.

Figures 1, 2:
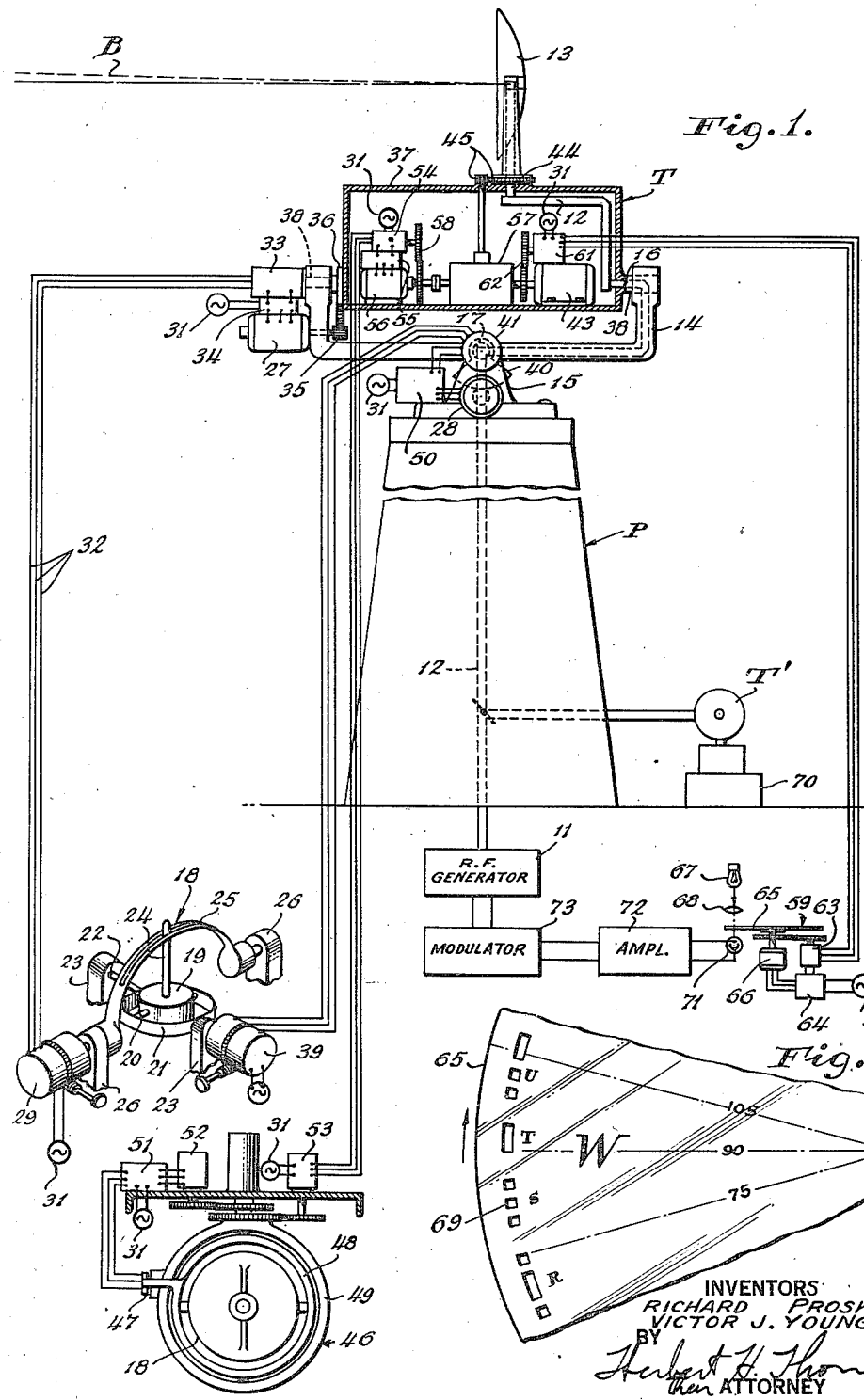
Fig. 1 is a schematic arrangement of the elements composing a stabilized rotating beacon transmitter.
Fig. 2 is a plan view of a fragment of one form of code wheel that may be used in modulating the radiated energy.
Figure 3:
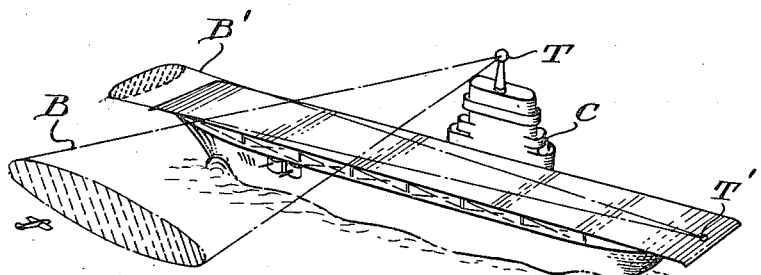
Fig. 3 is a perspective view of a dirigible craft such as an airplane carrier upon which the omnidirectional beacon may be mounted, showing an instantaneous position of the rotating beacon as intercepted by an aircraft.

Fig. 1 illustrates a simple typical embodiment comprising a transmitter or transmitting assembly T that may be mounted upon a suitable tower or other support P to locate the equipment as clear as possible from adjoining obstacles on the craft or other similar base C, shown as an aircraft carrier in Fig. 3. The transmitter comprises a radio frequency generator 11, preferably operating at microwave frequencies, and having a conduit or wave guide 12 for conveying the energy from the generator to a suitable directive radiating means 13, herein illustrated as a suitably energized parabolic reflector. The reflector 13, and hence the axis of the resulting directivity pattern or beam B may be stabilized to compensate for changes in the craft position. Suitably, the reflector 13 may be mounted upon a first trunnion support 15 and a second trunnion support 14, to provide corrective motion about the roll and pitch axes, respectively, of the craft C. Suitable rotating joints 16 and 17 are provided in the wave guide 12 to permit passage of the energy through the pivots of both trunnions. The simplified somewhat diagrammatic design of Fig. 1 is provided to facilitate an understanding of the invention, it being understood that in actual practice the parts are shaped and located to provide better compactness, more mechanical strength, and good electrical design.

The radiator 13 may utilize any conventional stabilizing devices to compensate not only for roll and pitch of the craft C but also for turning of the craft in azimuth. A typical arrangement of this is disclosed in Fig. 1 and comprises a vertical gyro 18 having a rotor mounted within a case 19 about a vertical axis. The case 19 is mounted about a horizontal pivot 20 located transversely of the craft within a gimbal ring 21, which ring in turn is supported on a normally horizontal pivot 22 extending longitudinally of the craft and supported for movement within bearings 23. A vertical rod 24 extends upwardly from the case 19 and projects through a slotted bail 25 pivoted about a transverse axis within pillow blocks or bearings 26. It is apparent from the foregoing, that the pivot 22 and the bail 25 are rotated by gyroscopic action as the supporting craft shifts about the roll and pitch axes.

Compensating means are provided for the roll and pitch movement to stabilize the reflector 13, and may comprise servo motors 27 and 28 responsive to the relative motion produced by the gyro 18. As shown in Fig. 1, one portion of a typical compensating system may comprise a pitch detector and transmitter 29, such as a self-synchronous transmitter of the type commercially referred to as a Selsyn or Telegon, the casing of which may be fixed relative to the craft, while the rotor is movable with respect thereto in response to the motion imparted by bail 25. An alternating sinusoidal voltage source 31 is connected to the transmitter 29 to serve as a phase reference. The relative position of the stator and rotor of transmitter 29 is indicated electrically by the signal appearing across wires 32 extending to a Selsyn receiver 33, the output from which controls the servo motor in any conventional manner, as by comparing the output signals with suitable reference signals, e. g., the reference voltage from source 31. The resulting error signal is fed to a servo amplifier 34 having output connections for driving the reversible servo motor 27 in a direction to compensate for changes about the pitch axis of the craft. The corrective motion is transmitted to the radiator 13 as by a pinion 35 engaging a gear sector 36 secured to a base 37 pivotable within the trunnion support 14 by means of studs 38, one of which connects with the rotor of the receiver 33 to provide a follow back motion and erase the signal when the corrective motion has been completed. A similar arrangement including a self-synchronous transmitter 39, a receiver 41, an amplifier 50, and servo motor 28 are provided to correct for shifting about the roll axis, base 37 being stabilized by the resultant motion of gear sector 40 attached to support 15. A higher degree of precision may be obtained by using such self-synchronous sets in pairs providing coarse and fine positioning respectively.

Suitable means are provided for rotating the reflector 13 at a uniform angular velocity about a vertical axis and may comprise a constant speed drive motor 43 for rotating the reflector about a vertical tubular pivot 44 as by means of gearing 45 connected in a suitable manner to the motor 43. The system may be compensated for changes in the attitude of the craft by means of a servo control mechanism responsive to a directional reference such as a marine gyroscopic compass or directional gyro 46 having a magnetic or equivalent pick-off device 47, one element of which is mounted on vertical ring 48, and the other element of which is secured to phantom ring 49, whereby turning of the craft in azimuth provides a relative movement between and a resultant signal from the respective elements. A follow-up mechanism 51 of conventional design restores the elements to a normal position by rotating the phantom ring 49 until the signal is erased and the elements are in alignment. The motion of ring 49 is imparted by servo motor 52 which also imparts a similar motion to the rotor of a self-synchronous transmitter 53, the stator of which is fixed relative to the craft C. The output signals from the transmitter 53 are conducted to a receiver 54 which cooperates with a reference voltage to provide a phase-sensitive signal to amplifier 55, the output of which operates motor 56 to rotate the armature thereof by an amount proportional to the turn of the craft. This motion may be combined with the motion of drive motor 43 with any conventional electrical or mechanical mechanism, typically by means of a differential gear drive 57, so that the rotation of the reflector 13 responds to the algebraic sum of the motions imparted by motors 43 and 56. The component provided by motor 56 rotates the reflector by an amount equal to the angle through which the craft turns. Gears 58 convey the motion from the motor 56 to the rotor of receiver 54 and hence operate as a repeat-back. According to the foregoing, the reflector 13 rotates at a uniform rate and in a constant cyclic relation with respect to the compass headings, independent of any turning motion that the support or craft may have.

The energy radiated by the transmitter may be modulated as a function of azimuth by synchronizing the rotary motion of the radiator 13 with the action of a keying mechanism or similar modulation control 59. Although any suitable connection, such as a mechanical transmission may be used between the radiator 13 and the modulator control 59, an electro-mechanical transmission system may be preferred, and may comprise a self-synchronous transmitter or Selsyn 61 connected with the motor 43 as by gears 62. A receiver 63 cooperates with a reference 31 to supply amplifier 64 with suitable signals representing the motion imparted to the rotor of Selsyn 61. A code wheel 65 is rotated by motor 66 energized by the amplifier 64. The code wheel is shown to illustrate one type of convenient automatic modulation control capable of characterizing the radio frequency energy for the various directions in azimuth. For a simple control, the wheel 65 may be made of opaque material and may be provided with peripheral perforations 69 corresponding to dot and dash code symbols, as clearly indicated in Fig. 2. A light source 67 and lens system 68, arranged as shown in Fig. 1, provide a light beam that is cooperative with the respective perforations 69 to intermittently energize photo-cell 71. The photo-electric impulses may be conducted to amplifier 72 where their intensity is increased sufficiently to operate a modulator 73 suitably connected to the radio frequency generator 11. It will be apparent that as the reflector 13 rotates, the electromagnetic energy is modulated as by being keyed to present dot and dash signals characterizing the respective azimuthal positions of the beam B, irrespective of the orientation of the craft C.

Figure 4:
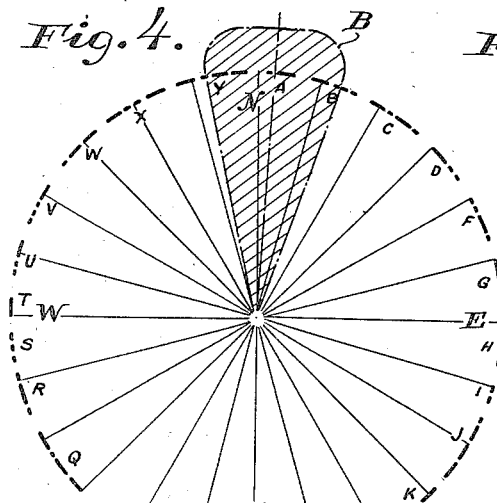
Figs. 4 and 5 are diagrams illustrating two possible coded modulation arrangements that might be employed with the system.
Figure 5:
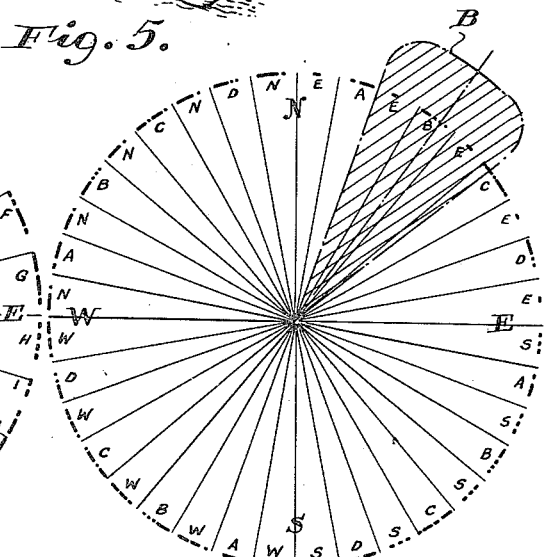

Although various arrangements of the coded symbols about the cycle of rotation are possible, two representative arrangements are shown in Figs. 4 and 5. In each of these figures the superimposed electromagnetic beam B is represented in an instantaneous position by a shaded wedge-shaped portion radiating from the transmitter T, to illustrate the beam modulation at any desired direction, the radial sides denoting the threshold of the heard signals. The speed of rotation of the beam and code disc depends largely on the ability of the pilots to distinguish the modulation characters while the system is in operation. Assuming approximately twenty-five separate characters about the periphery to denote the respective directions, the equivalent of five standard five-letter words are transmitted per revolution, so that at a speed of four revolutions per minute, the pilot hears the signals at the rate of twenty words per minute. It has been found in practice that pilots having a telegraphic code speed of ten words per minute readily respond to the operation of the device, even when it is operated at a rate corresponding to twenty words per minute, because for any given position of the receiver, only several code letters are heard during each rotation of the beam, and a waiting or rest period occurs between successive receptions.

Figure 6:
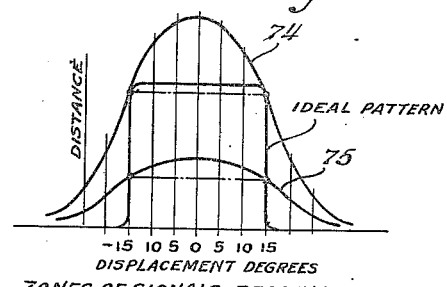
Fig. 6 is a graph illustrating an ideal form of the directive radiation pattern superimposed on typical patterns used with the system.

The number of code letters heard at any receiving point depends principally upon the width of the beam B. In a typical arrangement, as shown in Figs. 4 and 6, the beam has a total width of approximately 30°. The ideal pattern follows the general shape shown in Fig. 6, wherein the beam is shown to have uniform intensity throughout substantially the entire beam width. While this is not readily obtainable in actual practice, advantages accrue from approximating the ideal pattern as closely as possible as will more fully appear.

Referring now more especially to Fig. 4, a beam B having a width of the order of 30°, as indicated by the shaded area, may be rotated in azimuth as by means of equipment shown in Fig. 1. The periphery of the code wheel may be divided into equally spaced dot and dash code symbols to form individually distinctive, equally-separated characters designating respective directions. Since the precision of the system depends largely upon the number of divisions employed, use is preferably made of a large number of characters. In Fig. 4, twenty-four divisions apportion the circle into 15° units. It will be apparent that such a large number of separate code characters requires the use of symbols having different transmission times if a constant transmission rate is utilized. Thus, for example, the International Morse characters for the letters I and T require a considerably shorter transmission time than such letters as O and Q.

Instead of confining the code characters within equal arcuate or angular subdivisions, it is herein proposed to uniformly space the characters about the periphery, and to provide the pilot with a chart, having the general arrangement of Fig. 4, with or without a rotatable element designating the beam B from which the relation between the elements of the code character and the boundaries of its corresponding arcuate subdivision might be apparent from inspection. In practice, this is done by resolving the circle into the number of units required to provide equally spaced characters, using some arbitrary scale of units, as one dot equals one unit, one dash equals three units, one space between characters equals three units, and one space between the elements of a character equals one unit, from which the entire number of units may be determined. A more efficient utilization of time and a smoother transmission of code characters is obtained by thus equally spacing the characters about the circle, rather than centering the characters in equally spaced subdivisions. No confusion is created by the fact that the portions of some code letters extend into adjoining subdivisions, since the pilot can make adequate compensation for the inequality in the length of the letters, and may, in fact, use the respective portions of the letters to denote the precise headings designated on the chart in Fig. 4.

It will be observed that as the beam rotates, the energy is modulated by the code wheel and modulator according to the interception of the respective characters about the periphery by the axis of the beam B. Thus, in the instantaneous position shown in Fig. 4, assuming the beam to be rotating in a clockwise direction, the energy has just been keyed to provide a dot forming the first element of the letter A, and is about to form the dash, or second element thereof. The beam, having a substantial width, provides signals while the axis of the beam traverses an arc defined by the shaded area, so that with the illustrated example, an operator hears substantially three consecutive letters transmitted for any given position. Knowing the beam width, the operator may determine his bearing according to the characters that he first hears as the beam approaches his position. For the instantaneous position designated by Fig. 4, the operator would first hear the dot in the letter Y, which by reference to the chart would indicate his position as approximately 5° east of north, fixing his heading when homing on the craft C at 185°. In the alternative, the operator may judge the center of the code character sequence directly, which for the position of Fig. 4 would be the middle of the letter A. Compensation for drift may be made as in the case of a cross-wind by having the pilot observe any shift in the sequence of letters as he pursues the indicated heading. Thus, if during each revolution of the beam the pilot hears more of the letter Y and less of the letter B, he knows that his aircraft is being deflected toward the west, and that the aircraft must be crabbed until the code sequence does not change.

Fig. 5 illustrates a modified code arrangement that possesses some advantages over the arrangement of Fig. 4 in that fewer code characters are used, and accordingly the characters may be of shorter length and of more equal duration. To simplify the disclosure, however, the arrangement of Fig. 5 arbitrarily utilizes the code symbols for the four compass headings, in conjunction with the first four letters of the alphabet, without necessarily choosing the shortest characters. In the arrangement of Fig. 5, use is made of the principle of identifying alternate subdivisions with a character designating a particular sector. Thus, the upper righthand sector or quadrant may be formed of a number of subdivisions, alternate subdivisions of which are identified by the letter E to designate what might be called the east quadrant. Thus, as the axis of the beam B reaches the angular position corresponding to the respective subdivisions, the energy of the beam is modulated as by forming the corresponding code characters in the manner described in connection with Fig. 4. In a similar manner, alternate subdivisions of the other sectors may be identified with the letters S, W, and N, to designate the south, west, and north quadrants, respectively, while the remaining respective subdivisions of each sector may be characterized in some arbitrary manner, preferably following a uniform pattern. This establishes a uniform system of identifying alternate subdivisions according to the quadrant in which they are located, and identifying the remaining subdivisions according to their position in the quadrant.

Thus, with the arrangement of Fig. 5, the compass chart may be formed of thirty-six convenient subdivisions, while using only eight code characters for the purpose. This provides some advantage over the use of individual characters, as shown in Fig. 4, wherein the number of characters preferably is equal to the number of subdivisions. Since the operator always hears more than one character, he is always able to determine his position as a function of the sector-identifying character, and the character locating the adjoining subdivision.

The beam preferably is fan-shaped, in that it has a large angular dimension in azimuth compared with its dimension in elevation, as suggested in Fig. 3. A system incorporating the principles of the present invention utilizes a beam thickness of the order of 3° and a beam width of the order of 30°. Since the system is intended largely for use on marine vessels, confining the beam thickness decreases the amount of energy lost to the surrounding water. A compromise must be effected between keeping the beam generally horizontal to maximize the effective range, and losing energy to the water. An elevation angle ½° is recommended, as this has been found to provide an operating range of approximately one hundred miles with receivers at reasonable altitudes, while losing only a moderate percentage of the energy to the water.

Although the beam has been shown in its ideal condition in Figs. 4 and 6, it has been found that the beam becomes wider as the transmitter is approached, as indicated by curves 74 and 75 showing the constant intensity pattern of a radiated beam, at two different field strengths.

Automatic volume control is ineffective to damp out the undesirable signals because the beam is inherently broader close to the transmitter and the pilot may receive signals throughout almost a complete revolution of the beam, thus tending to confuse him. If at such a time the pilot is not within sight of the craft C, he may not know accurately what final corrections in heading are to be made in order to reach the craft. Where this is found to be a serious condition, it may be overcome by employing an improved automatic volume control system of the general type illustrated in Fig. 7. Such a volume control measures the time interval during which any signals are received, and adjusts the sensitivity or gain of the receiver according to whether the signals are heard for a longer or shorter period than a predetermined norm. Thus, if a 30° beam is rotating at four revolutions per minute, its signals should be heard during 1⅛ seconds of each revolution. By adjusting the volume control to provide increasing gain when the signals are heard for a shorter period, and decreased gain when the signals are heard for a longer period, the signals heard may be confined to substantially a 30° arc.

Figure 7:
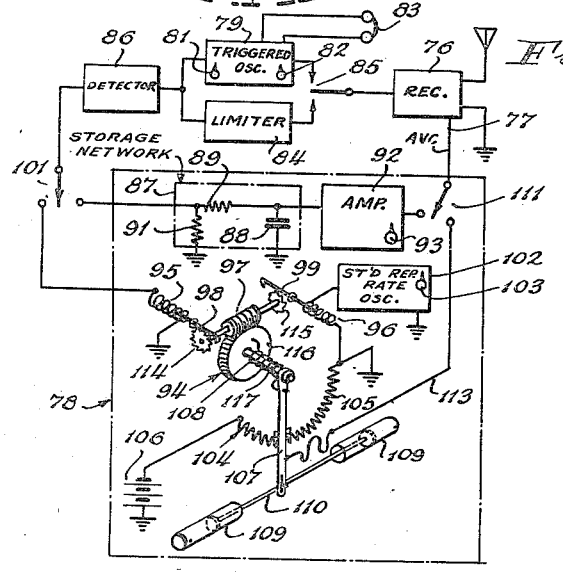
Fig. 7 is a diagrammatic view of an improved type of automatic volume control circuit that might be used in the receiver of the radiated energy.

Although use may be made of electronic or mechanical timing of the interval at the beginning and end of each period of reception, for comparison with a normal interval, the presently disclosed code modulation system lends itself more especially to the use of a pulse counter or integrating circuit which either may develop the volume control signal directly or develop an error signal by comparison with a normal signal for controlling the receiver sensitivity. The arrangement of Fig. 7 schematically illustrates one form of apparatus that may perform the foregoing function and comprises a receiver 76 having conventional antenna and ground connections. The receiver is provided with an automatic volume control (A. V. C.) voltage over wire 77, the control effect of which is based on a time function as determined by a comparator assembly 78 adapted to vary the A. V. C. voltage according to whether the signals are received for a period less than or in excess of a predetermined normal period.

To render the control system independent of received signal amplitude use is preferably made of a triggered oscillator 79 preferably operating at some suitable medium range audio frequency, e. g. of the order of 1,000 cycles. The threshold point at which the oscillator is triggered may be manually controlled, if desired, by means of a control knob 81, and the oscillator output may be regulated by a energy control knob 82. Earphones 83 may be energized by the oscillator 79 at its fixed audio frequency to provide the operator with the received code signals.

If desired, the ear-phones 83 may connect directly with the receiver 76, and the comparator 78 may be actuated by the receiver output when corrected for output variations by a limiter 84. A switch 85 permits either the oscillator or the limiter to be connected to the receiver output. The output signals may be rectified as by a detector 86, the output of which feeds into the comparator 78.

Two methods are shown for comparing the duration of each group of received signals with a predetermined normal interval. The first utilizes a storage network 87 comprising a conventional integrating circuit formed of a suitable condenser 88 and resistors 89 and 91 connected in series and parallel respectively with the condenser 88. Though specific circuit constants depend upon individual operating conditions, the condenser 88 should be of the order of a plurality of micro-farads and should be capable of holding its charge for a long time compared with a cycle of operation, e. g. 15 seconds. The resistors 89 and 91 are proportioned to provide a quick charging rate and a slow discharge rate such that the circuit time constant, on charge, is large with respect to the duration of the received signals, but short with respect to the duration of an entire cycle. The time constant on discharge should be somewhat larger than the duration of the entire cycle.

A direct current amplifier 92 having a gain control 93 amplifies the voltage appearing across network 87, thereby regulating the amount of control exercised by the network potentials on the receiver 76. The foregoing network operates on the principle that during any given portion of a cycle of operation, the ratio of the total time that the transmitter is on to the total period of the cycle of operation is roughly a constant, so that if operation is desired over 30° of arc, the total transmission time during which energy is stored in the network may be closely determined. In any event, the error occurring at different portions of the operating cycle is not substantial enough to create appreciable error. Accordingly, the network 87 is arranged to provide a predetermined A. V. C. voltage in conjunction with the amplifier 93 when the signals are received over a predetermined portion of the operating cycle. If the signals are received for a longer period, the volume control signal increases and is operative to reduce the operating threshold of the receiver, so that during the ensuing cycle fewer signals are heard. Conversely, if the signals are heard for a shorter than normal time, the A. V. C. voltage generated raises the threshold level and permits the reception of additional signals during the ensuing cycle.

The second form of comparator 78 utilizes the principle that substantially the same number of pulses are received while the beam rotates through any sector having the same angle, irrespective of whether the received pulses are short or long. Use is made of a stepped relay 94 having a pair of opposed solenoids 95 and 96 respectively operative to rotate a worm 97 in opposite directions. As shown in Fig. 7, the armatures of solenoids 95 and 96 may connect with pawls 98 and 99 engaging the teeth of ratchets 114, 115 connected to worm 97, to index the respective ratchets one tooth each time the solenoids are energized, thereby rotating the worm 97 and worm wheel 116 in the desired direction. The worm wheel 116 is operated in one direction, e. g. counter-clockwise by passing the rectified pulses from the triggered oscillator 79 through the coil of solenoid 95, the circuit being completed by means of a switch 101 by which the detector 86 may be connected either with the network 87 or the solenoid 95. In the open position, switch 101 permits the automatic volume control to be temporarily disconnected and thereby allows the operator to check his bearings according to whether the signals increase or decrease in duration as the receiving station moves relatively to the transmitter.

A standard repetition rate oscillator 102 with frequency adjuster 103 provides as many opposing pulses during a cycle of operation as normally should be received from the beam B as it sweeps past the receiver. A potentiometer 104 comprising a resistance strip 105 is connected across a suitable bias voltage source 106. A contact arm 107 is mounted freely on shaft 117 and connects with the worm wheel 116 through a spiral or helical spring 108, permitting relative motion between the parts to either side of a neutral position. Wire 113 extends from the arm 107 to a switch 111 connecting wire 77 with either comparator. A pair of dashpots 109 having plungers connecting with arm 107 through rod 110 stabilize the movement of the arm against the intermittent motion of gear 97 tending to move the arm.

Assuming that it is desired to receive signals over 30° of beam arc at all positions of the receiver, while the beam rotates at four revolutions per minute, and assuming that eight code elements (dots and dashes) normally are transmitted in any 30° arc, eight pulses energize solenoid 95 as the beam sweeps past the region of the receiver, thereby indexing the ratchet 114 through an angle intercepted by eight teeth, and rotating worm wheel 116 by a fixed amount. The dashpots 109 are adjusted for a relatively long time constant, and restrain consequent movement of the contact arm 107, so that the worm wheel 116 instead rotates relatively to the arm against the action of spring 108. The oscillator 102, however, adjusted to thirty-two oscillations per minute, produces a like number of neutralizing pulses during the fifteen second period required for one rotation of the beam, whereby the solenoid 96 is energized eight times each cycle to rotate the worm 97 through the same subtended angle in a direction opposite to that produced by solenoid 95. Accordingly, under normal operating conditions, the motion intermittently imparted by the pawl 98 is exactly neutralized over the entire cycle by the regular recurrent motion of pawl 99 so that the contact arm 107 never moves more than a slight distance to either side of the neutral position. In such a range of positions, the arm 107 taps a predetermined normal voltage from potentiometer 104, and applies this voltage through wire 113 to wire 77 by means of switch 111, which may be ganged with switch 101.

Should the received signals differ in number per cycle from the standard number generated during the cycle by the oscillator 102, the contact arm 107 digresses gradually from its normal position until it reaches a new normal position to one side or the other of the neutral position shown. If too many signals are received, the arm 107 moves so as to increase the bias voltage applied to the receiver 76, so that during the ensuing cycle the number of received impulses strong enough to trigger the oscillator are reduced in number. Conversely, if too few signals are received, indicating reception over too small a portion of each cycle, the arm 107 moves along the strip 105 to decrease the volume control bias, thereby rendering the receiver and oscillator sensitive to additional signals in the ensuing cycles.

It will be apparent from Fig. 6 that the receiver threshold is varied to establish the sensitivity required for a predetermined period of reception. Thus, whether the beam is heard at distances corresponding to the field strength pattern 74 or according to the field strength pattern 75, the receiver sensitivity is adjusted so that reception is limited to the time required for the beam to travel through a prescribed arc, e. g. 30°.

The pilot, having reached the proximity of the ship, may desire to make a suitable instrument landing thereon. This may be effected with the use of a separate transmitter T' of relatively low power, which may be useful in orienting the aircraft with the runway on the aircraft carrier. While a conventional instrument landing system may be used for the purpose, it is herein proposed to use a separate transmitter operating on the same or substantially the same frequency but of such low power as to cause little or no interference with the transmission of the main beam B. The transmitter T' thus may generate a localizer beam B' having an effective range of perhaps two miles. The transmitter T' may be energized by a portion of the energy flowing in conduit 12 as indicated in Fig. 1, or a continuous wave from a separate generator 73 may be used to distinguish the signal from the coded signal of the beam B. The pilots homing on the craft C accordingly reach the neighborhood of the craft by utilizing the information of the rotating beam B, and may determine the attitude of the aircraft C by circling the craft to intercept the beam B'. By bracketing the beam B', a suitable landing on the runway thereof might be effected by maintaining a constant intensity signal in the receiver as the beam is followed.

The system affords a large measure of secrecy, since it ordinarily is placed in operation for short intervals at a time, e. g., for a period of less than an hour, required to bring the pilots in from a radius of the order of several hundred miles. The small beam thickness precludes reception to a specific narrow range of elevation for any given distance and thereby minimizes the possibility of interception by enemy craft. By the time any effective potentially dangerous enemy operation can be organized, the rotating beam B will have served its purpose and will be turned off.

With a beam of accurately known configuration, and especially where use is made of a timing circuit in the automatic volume control, the system affords a ready means for a pilot to estimate his distance from the craft C. This is done simply by pursuing a course roughly perpendicular to the desired homing heading until the recurring code signals gradually indicate that the pilot has entered a new subdivision. By means of the same method used in determining the craft position, the pilot may determine the time required for him to travel through any predetermined arc from a previous position as indicated by a change in the recurring group of signals, and by knowing the craft's speed may calculate the actual distance traversed for a given change in heading. Since the beam width in linear units is directly proportional to range, the distance of the aircraft from the carrier or base C may be readily calculated as the product of the distance travelled and a predetermined constant based on the beam characteristics. To overcome error introduced by wind, the pilot may retrace his path in the opposite direction and base his distance determination on the average time required.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An omnidirectional radio beacon comprising means for rotating a beam of electromagnetic radiation, means for modulating said beam with different code signals to distinguish each of a plurality of sectors through which said beam sweeps, and means for further modulating said beam with similar code signals different from said first signals to identify corresponding portions of each of said sectors.

2. A rotating radio beacon system comprising means for rotating a beam of electromagnetic energy, and modulating means for characteristically modulating said beam as said beam sweeps through successive subdivisions of each of a plurality of sectors, said modulating means including means for modulating said beam with similar code signals for each of the positions corresponding to alternate subdivisions of a given sector, and means for modulating said beam in a characteristic manner with individually distinctive code signals for portions corresponding to all of the remaining subdivisions of said given sector.

3. A rotating radio beacon system comprising means for rotating a beam of electromagnetic energy, and modulating means for characteristically modulating said beam as said beam sweeps through successive subdivisions of each of a plurality of sectors, said modulating means including means for modulating said beam with code signals for positions corresponding to alternate subdivisions of all sectors in a manner distinctive from each of the remaining subdivisions of all sectors, and means for modulating said beam for positions corresponding to the remaining subdivisions of each sector with similar code signals distinctive from the equivalent subdivisions of the remaining sectors.

4. A rotating radio beacon system, comprising means for rotating a beam of electromagnetic energy recurrently through a plurality of sectors comprising a complete revolution, means for code modulating said beam characteristically for each of the positions corresponding to a plurality of alternate subdivisions of each of said sectors, so that corresponding subdivisions of each sector are similarly coded, and means for code modulating said beam at all of the remaining subdivisions of each sector in a manner distinctive from the remaining subdivisions of the other sectors.

5. A rotating radio beacon system, comprising means for rotating a beam in azimuth, means for producing recurrent modulations of said rotating beam in a manner characteristic of each compass quadrant as said beam sweeps through such quadrant, and means for modulating said beacon between said respective recurrent modulations in a manner distinctive from the remaining modulations occurring within a given quadrant.

6. In a method of indicating orientation relative to a source of electromagnetic energy, the steps comprising rotating a beam of directive radiation through a plurality of sectors, modulating said beam characteristically when sweeping through alternate subdivisions of each sector so that each such subdivision is identified, and modulating said beam when sweeping through the remaining subdivisions in a manner characterizing the sector containing such remaining subdivisions.

7. In a rotating beacon system, the method of determining a position in terms of the sectors through which said beacon sweeps comprising identifying alternate subdivisions of the sectors composing a complete rotation according to the sector containing such subdivisions, and identifying the remaining subdivisions of each sector according to the arrangement of the respective subdivisions in their sector.

8. A method of transmitting directional information, comprising rotating a beam of electromagnetic energy through a plurality of sectors, keying said energy to produce a coded signal characterizing the respective sectors when said beam passes through alternate subdivisions of such sectors, and keying said energy to produce different signals characterizing the location of each remaining subdivision in its sector when said beam passes through such remaining subdivisions.

9. A method of transmitting directional information comprising rotating a beam of electromagnetic energy recurrently through a plurality of sectors defining a field of operation, subdividing said sectors into divisions having a width less than the beam width, modulating said energy when the center of said beam passes through alternate divisions in a manner characterizing the sector containing such divisions, and modulating said energy when the center of said beam passes through the remaining subdivisions in a manner characterizing the location of such divisions within each sector.

10. In a rotating beacon system, wherein a beam of electromagnetic energy rotates recurrently at a uniform rate through a complete revolution, the steps comprising arranging dot and dash code symbols to form individually distinctive, equally-separated characters about a circular arc simulating the field of operation of said beam, modulating said beam according to said characters as the position of said beam and said characters coincide, the arc intercepted by each character being dependent upon the time required to modulate said beam with such characters, and indicating the angular relation between said respective characters and an equal number of evenly spaced radial lines designated fixed courses homing on the source of said energy.

11. In a system of navigating a craft relative to a source of radiated electromagnetic energy, the method of determining the distance between said craft and said source, comprising radiating said energy as a beam having a pattern defined by angularly displaced substantially radial lines extending from said source, and measuring the time interval between the interception of said respective lines by said craft at a known relative velocity between said craft and said beam.

RICHARD PROSKAUER.
VICTOR J. YOUNG.

REFERENCES CITED

The following references are of record in the file of this patent:

UNITED STATES PATENTS

| Number | Name | Date |
|---|---|---|
| 2,216,707 | George | Oct. 1, 1940 |
| 2,314,029 | Bond | Mar. 16, 1943 |
| 2,082,347 | Leib | June 1, 1937 |
| 2,063,610 | Linsell | Dec. 8, 1936 |
| 2,257,320 | Williams | Sept. 30, 1941 |
| 2,288,102 | Meredith | June 30, 1942 |
| 1,525,783 | Trenor | Feb. 10, 1925 |
| 833,034 | De Forest | Oct. 9, 1906 |